United States Patent
Ha et al.

(10) Patent No.: US 8,437,155 B2
(45) Date of Patent: May 7, 2013

(54) DEVICE FOR POWER FACTOR CORRECTION IN THREE PHASE POWER SUPPLY AND CONTROL METHOD THEREOF

(75) Inventors: Jong Hun Ha, Suwon-si (KR); Ho Gul Song, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 860 days.

(21) Appl. No.: 12/379,432

(22) Filed: Feb. 20, 2009

(65) Prior Publication Data
US 2010/0073975 A1 Mar. 25, 2010

(30) Foreign Application Priority Data
Sep. 22, 2008 (KR) .................. 10-2008-0092624

(51) Int. Cl.
*H02M 5/45* (2006.01)
*H02M 5/42* (2006.01)
*H02M 7/04* (2006.01)
*H02M 7/68* (2006.01)

(52) U.S. Cl.
USPC .............................. 363/37; 363/89

(58) Field of Classification Search .......... 363/34, 363/37, 56.02, 98, 132, 89
See application file for complete search history.

(56) References Cited

U.S. PATENT DOCUMENTS

| 4,052,648 | A | * | 10/1977 | Nola | 318/810 |
| 4,433,276 | A | * | 2/1984 | Nola | 318/729 |
| 4,459,528 | A | * | 7/1984 | Nola | 318/729 |
| 4,620,272 | A | * | 10/1986 | Fulton et al. | 363/53 |
| 5,892,674 | A | * | 4/1999 | Shimada et al. | 363/127 |
| 6,121,758 | A | * | 9/2000 | Bellina et al. | 323/211 |
| 6,137,700 | A | * | 10/2000 | Iida et al. | 363/89 |
| 6,757,185 | B2 | * | 6/2004 | Rojas Romero | 363/89 |
| 6,801,005 | B2 | * | 10/2004 | Charleston | 318/438 |
| 2003/0090222 | A1 | * | 5/2003 | Charleston | 318/254 |

FOREIGN PATENT DOCUMENTS
JP 2000-324809 11/2000

\* cited by examiner

*Primary Examiner* — Jue Zhang
(74) *Attorney, Agent, or Firm* — Staas & Halsey LLP

(57) ABSTRACT

A device correcting a power factor caused by an input current delay of a three-phase inverter and a method of controlling the same are disclosed. In case of a product having a high-current power environment and a high-capacity inverter, a three-phase power factor correction (PFC) device detects any erroneous PFC operation of the three-phase inverter using a current sensor located at a common potential terminal. So, if the input current delay occurs, the three-phase PFC device delays an ON time of a switching element from a zero-crossing point of the input voltage, and performs an optimum switching operation caused by the input-current delay, resulting in the implementation of an increased power factor.

12 Claims, 5 Drawing Sheets

DEVICE FOR POWER FACTOR CORRECTION IN THREE PHASE POWER SUPPLY AND CONTROL METHOD THEREOF

CROSS-REFERENCE TO RELATED APPLICATIONS

This application claims the benefit of Korean Patent Application No. 2008-0092624, filed on Sep. 22, 2008 in the Korean Intellectual Property Office, the disclosure of which is incorporated herein by reference.

BACKGROUND

1. Field

The present invention relates to a power factor correction (PFC) device in three-phase power supply (hereinafter referred to as a three-phase PFC device) and a method for controlling the same, and more particularly to a PFC control method based on a delay of an input current signal of a three-phase inverter.

2. Description of the Related Art

Generally, an inverter is a power-supply converter (also called a power converter) for converting a DC voltage into a three-phase AC voltage (U, V, W). Due to high energy efficiency and convenience of output control, the inverter has been generally used to control motors for use in a variety of electronic products (e.g., washing machines, refrigerators, air-conditioners, microwave ovens, and elevators).

A rectifying circuit for rectifying a commercial AC power into a DC voltage and smoothing this rectified DC voltage is connected to the above-mentioned inverter, such that the DC voltage smoothened to a predetermined level is provided to the inverter. A power factor of this rectifying circuit is very low, i.e., about 0.5-0.6. Due to a phase difference between an input voltage (i.e., a voltage of AC power) and an input current (i.e., a current of AC power), a power factor is decreased, such that there arises a loss of power consumption caused by a reactive power.

In order to solve the above-mentioned problems, a conventional art carries out power factor correction (PFC) operations, which corrects a power factor to prevent the occurrence of a phase difference between an input voltage and an input current, using a switching control scheme. This switching control scheme detects a zero-crossing point of an input voltage, turns on a switching element at the detected point, turns off the switching element after the lapse of a predetermined period of time, and maintains an OFF status of the switching element until reaching a zero-crossing point of the next input voltage.

However, if a current signal increases in a three-phase inverter which uses a three-phase power supply to power on electronic products of large amounts of power consumption, a phase current is slower than a phase voltage, such that there is a disadvantage in the above-mentioned conventional PFC control method allowing the switching to be carried out at a zero-crossing point of the phase voltage for power factor correction. In other words, according to the conventional PFC control method, a product having a high-current power environment and a high-capacity inverter is unable to begin performing the PFC switching at a desired point as the used current increases, and a phase difference between the voltage and current signals increases by any PFC switching errors caused by the delayed current, such that the power factor decreases even more, resulting in the increase in power consumption.

SUMMARY

Therefore, it is an aspect of the present invention to provide a three-phase power factor correction (PFC) device which delays an ON time of a switching element of a three-phase inverter based on a switching control scheme for power factor correction from a zero-crossing point of an input voltage, such that it increases a power factor by an optimum switching operation caused by an input current delay, and a method of controlling the same.

Additional aspects and/or advantages of the invention will be set forth in part in the description which follows and, in part, will be apparent from the description, or may be learned by practice of the invention.

The above and/or other aspects of the present invention can be achieved by the provision of a three-phase power factor correction (PFC) apparatus to operate on a three-phase power source including: a rectifier to rectify the three-phase power source; a switching element which performs a power factor correction (PFC) switching operation to correct a power factor of the rectifier; a zero-crossing detector to detect a zero-crossing point of an input voltage signal received from the three-phase power source; a current detector to detect a delay of an input current signal received from the three-phase power source; and a controller which delays the PFC switching from the zero-crossing point of the input voltage signal according to the delay of the input current signal, and controls the switching element.

The switching element may be an insulated gate bipolar transistor (IGBT) switch, which is connected to individual phases of output terminals of the rectifier, and switches output signals of the individual phases to allow the output signals of the individual phases to have the same current and voltage phases.

The current detector may be connected to an output common potential terminal of the switching element, such that it may detect an erroneous current loaded on the common potential terminal during the PFC. The erroneous current may allow a current signal flowing in a direction opposite to that of the input voltage to have a peak value of at least a reference value. The controller may determine a delay of the input current when the erroneous current occurs at least a predetermined number of times.

The controller may decrease the PFC switching delay time at intervals of a predetermined time, such that it may continuously detect a performance of the PFC operation. The PFC switching delay time may be a predetermined time consumed until the input voltage phase is equal to the input current phase.

The foregoing and/or other aspects of the present invention are achieved by providing a three-phase power factor correction (PFC) control method including: rectifying a three-phase power source; performing a power factor correction (PFC) switching on a switching element to correct a power factor of the rectified power source; detecting a zero-crossing point of an input voltage signal received from the three-phase power source; detecting a delay of an input current signal received from the three-phase power source; and delaying the PFC switching from the zero-crossing point of the input voltage signal according to the delay of the input current signal, and controlling the switching element according to the delayed result.

The detecting of the delay of input current signal may include: detecting an erroneous current loaded on a common potential terminal of the switching element during the PFC operation, determining whether the erroneous current signal occurs at least a predetermined number of times during a predetermined time, and determining the delay of the input current signal if the erroneous current signal has occurred at least the predetermined number of times during the predetermined time.

The delaying of the PFC switching may include: if the input current delay has occurred, delaying an ON time of the switching element from the zero-crossing point of the input voltage by a predetermined PFC switching delay time, and controlling the switching operation according to the delayed result.

The PFC switching delay time may be decreased at intervals of a predetermined time, such that a performance of the PFC operation may be continuously detected.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
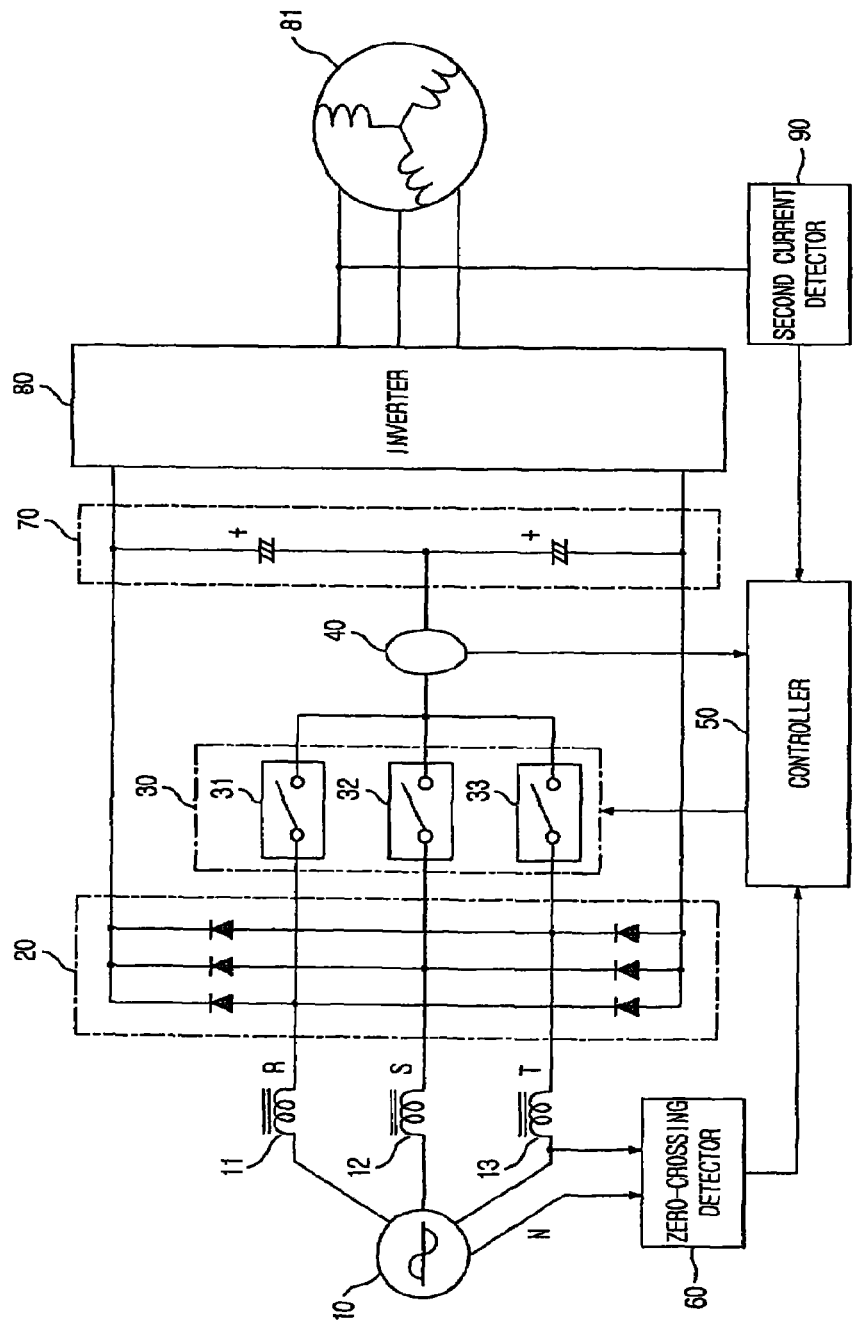
FIG. 1 is a circuit diagram illustrating a power factor correction (PFC) device for a three-phase inverter according to an embodiment of the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

FIG. 1 is a circuit diagram illustrating a power factor correction (PFC) device for a three-phase inverter according to the embodiment of the present invention.

Referring to FIG. 1, the PFC device of the three-phase inverter includes a rectifier 20, a switching unit 30, a first current detector 40, and a controller 50. The rectifier 20 rectifies individual phases of a three-phase power source 10 (i.e., R-, S-, T-phase AC power source). The switching unit 30 is connected to an output terminal of the rectifier 20, and performs the PFC switching not to generate a phase difference between voltage and current signals of the output signal of the rectifier 20. The first current detector 40 is connected to a common potential terminal of the switching unit 30, such that it detects a current signal generated by the PFC operation. The controller 50 controls the PFC operation, such that it enables a phase of a phase current signal to chase a phase of a phase voltage signal.

In the three-phase power source 10, three sinusoidal currents having the same amplitude and frequency flow in three phases (i.e., R, S, and T phases) having a phase difference of 120°, and an N phase at which individual center points of three phases (R, S, T) are gathered is grounded, such that a 3-phase and 4-line wiring scheme is generally used for the three-phase power source 10.

The switching unit 30 may include three IGBT switches 31, 32, and 33 respectively connected to R, S, and T phases connected to the output terminal of the rectifier 20.

Reactors 11, 12, and 13 improving the power factor of the rectifier 20 are located between the three-phase power source 10 and the rectifier 20, such that the reactors 11, 12, and 13 are connected to R, S, and T phases, respectively. A zero-crossing detector 60 is connected to not only one phase (e.g., T phase) from among input terminals of the reactors 11, 12, and 13 but also an N phase, such that it detects zero-crossing points of input phase voltages and outputs the detected zero-crossing points to the controller 50.

Therefore, the controller 50 switches on the switching elements 31, 32, and 33 at the zero-crossing points of the phase voltages detected by the zero-crossing detector 60. After the lapse of a predetermined period of time, the controller 50 switches off the switching elements 31, 32, and 33 using a pulse width modulation (PWM) control method, maintains OFF states of the switching elements 31, 32, and 33 until reaching a zero-crossing point of the next phase voltage in such a way that it performs the PFC operation capable of correcting a power factor in order to prevent the occurrence of a phase difference between a phase voltage and a phase current.

In this case, the controller 50 determines the presence or absence of an erroneous PFC operation (e.g., a phase-current delay) of a product having both a high-current power environment and a high-capacity inverter on the basis of a current value of the first current detector 40, such that it is able to detect the erroneous PFC operation indicating that the phase current is slower than the phase voltage in proportion to the value of a used current. In other words, if it is determined that such erroneous operation has occurred, ON times of the switching elements 31, 32, and 33 for the PFC operation are delayed from the zero-crossing point of the phase voltage, such that the controller 50 performs an optimum switching operation to implement little phase difference between the phase voltage and the phase current, resulting in the improvement of the power factor.

The controller 50 automatically reduces ON-time delays of the switching elements 31, 32, and 33 at intervals of a predetermined time, such that it continuously observes the PFC performance caused by the phase-current delay.

The power factor correction (PFC) device of the three-phase inverter according to the embodiment of the present invention includes a DC link voltage generator 70, an inverter 80, and a second current detector 90. The DC link voltage generator 70 is connected to an output terminal of the rectifier 20, such that it generates a DC link voltage having an improved power factor. The inverter 80 is connected to the DC link voltage generator 70, converts the generated DC link voltage into a three-phase AC voltage, and transmits the three-phase AC voltage to a motor 81. The second current detector 90 detects the magnitude of a load current (i.e., a phase current) provided to the motor 81, and transmits the detected load-current magnitude to an analog-to-digital (AD) converter.

Therefore, the controller controls a duty ratio of a PWM signal controlling the switching elements 31, 32, and 33 according to the magnitude of load current detected by the second current detector 90.

The above-mentioned three-phase power factor correction (PFC) device and a method for controlling the same will hereinafter be described in detail.

Referring to FIG. 1, if the three-phase power source 10 is applied to the PFC device, the three-phase power source 10 serving as R-, S-, and T-phase AC power-supply signals is applied to the reactors 11, 12, and 13, and each of the R-, S-, and T-phase AC power-supply signals is applied to the rectifier 20, such that the R-, S-, and T-phase AC power-supply signals are rectified by the rectifier 20.

The voltage rectified by the rectifier 20 is applied to the DC link voltage generator 70, such that the DC link voltage generator 70 generates a DC link voltage needed to drive the motor 81. The DC link voltage generated from the DC link voltage generator 70 is supplied to the motor 81 via the inverter 80.

In this way, when the DC link voltage is supplied to the motor 81 via the three-phase inverter 80, the power factor deteriorate due to a phase difference between the phase voltage and the phase current applied to the reactors 11, 12, and 13.

Therefore, in order to solve the above-mentioned problems, the power factor correction (PFC) device according to the embodiment of the present invention allows the zero-crossing detector 60 connected to any one (e.g., T phase) of input terminals of the reactors 11, 12, and 13 as well as the N phase to detect a zero-crossing point at which phases of the phase voltages are zero-crossing, such that the zero-crossing detector 60 outputs the detected zero-crossing point to the controller 50. The controller 50 commands the second current detector 90 to detect the magnitude of a load current at the above-mentioned zero-crossing point detected by the zero-crossing detector 60, and calculates a pulse width (i.e., a duty ratio) on the basis of the detected load-current magnitude, such that it switches on the switching elements 31, 32, and 33 using a PWM control method based on the calculated pulse width.

If the switching elements 31, 32, and 33 are switched on, the phase current applied to the reactors 11, 12, and 13 linearly increases. If the switching elements 31, 32, and 33 are switched off by the PWM control of the controller 50, the phase currents applied to the reactors 11, 12, and 13 linearly decrease.

In this way, if ON and OFF operations of the switching elements 31, 32, and 33 are repeated by the PWM control of the controller 50, the phase current applied to the reactors 11, 12, and 13 tracks the phase of the phase voltage, and at the same time the power factor is improved in such a way that the PFC operation is carried out.

However, if the product having both a high-current power environment and a high-capacity inverter is used during the above PFC operation, the phase current is slower than the phase voltage in proportion to the used current, such that there is needed the power factor correction (PFC) control which corrects the power factor by arbitrarily delaying the PFC switching. A detailed description thereof will hereinafter be described with reference to FIG. 2.

Figure 2:
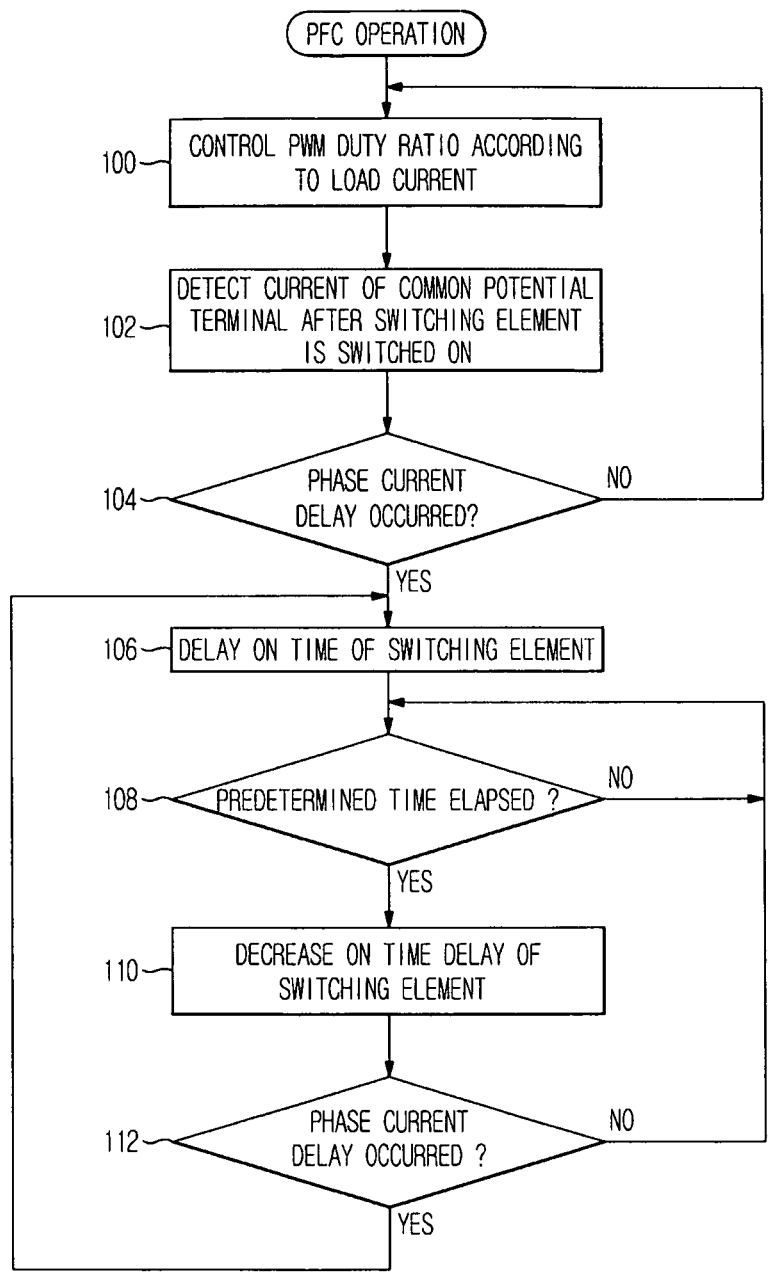
FIG. 2 is a flow chart illustrating a PFC control method for a three-phase inverter according to the embodiment of the present invention.

FIG. 2 is a flow chart illustrating the PFC control method for the three-phase inverter according to the embodiment of the present invention.

Referring to FIG. 2, at operation 100, in order to perform the PFC operation, the controller 50 switches on the switching elements 31, 32, and 33 using the PWM control at the duty ratio, which has been calculated according to the load-current magnitude detected by the second current detector 90.

Figure 3:
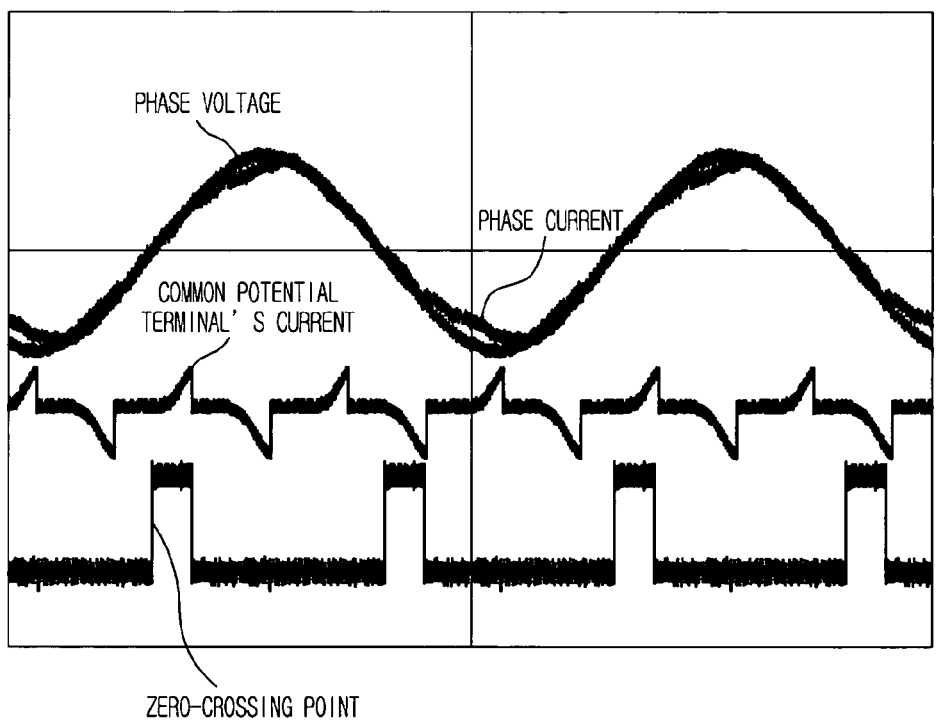
FIG. 3 is a waveform diagram illustrating a PFC switching operation when there is no delay in phase current signal according to the embodiment of the present invention.
Figure 4:
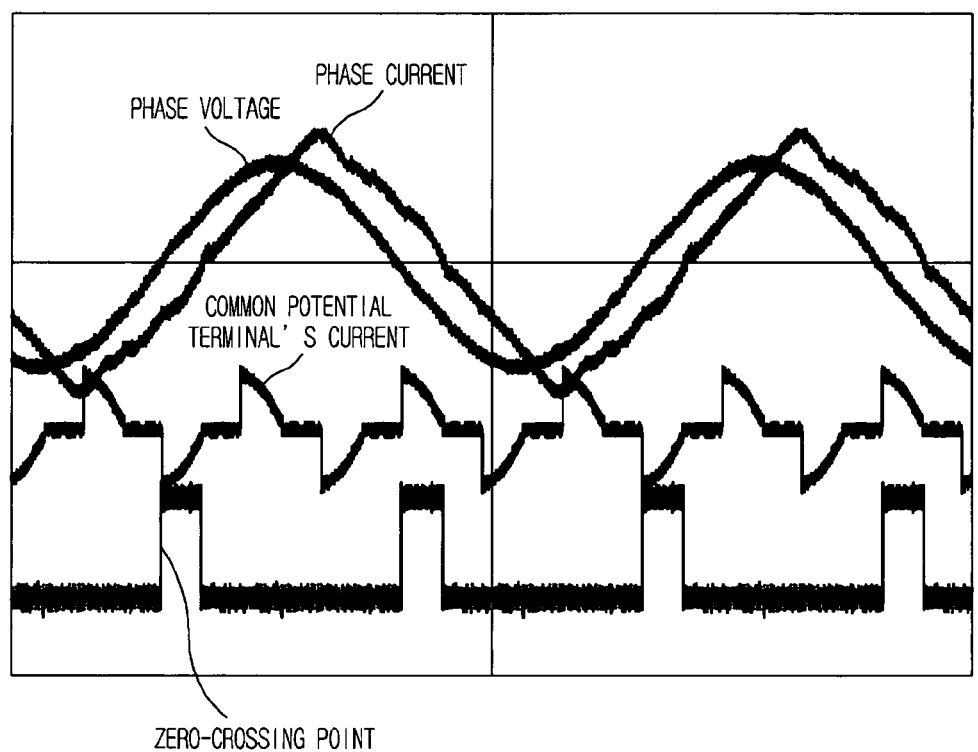
FIG. 4 is a waveform diagram illustrating a PFC switching operation when a phase current signal is delayed according to the embodiment of the present invention.

In order to detect any erroneous operation (e.g., a phase-current delay) generated by the PFC operation during the PFC operation, after the switching elements 31, 32, and 33 have been turned on, the first current detector 40 connected to a common potential terminal of the switching elements 31, 32, and 33 detects waves of a current signal (i.e., a switching current) of the common potential terminal as shown in FIGS. 3 and 4, and outputs the detected waves of the current signal to the controller 50 at operation 102.

Therefore, the controller 50 checks the common potential terminal's current waves detected by the first current detector 40 during a predetermined period of time (i.e., about 1 minute), such that it determines the presence or absence of the phase-current delay in which an erroneous current is repeated a predetermined number of times or more (i.e., about 10 times or more) at operation 104. The erroneous current signal is generated when the current signal flowing in a direction opposite to that of the phase voltage during the PFC operation has a peak value of at least a reference value. If the peak value of the current signal flowing in the direction opposite to that of the phase voltage occurs at least a predetermined number of times, it is determined that the phase-current delay has occurred.

FIG. 3 is a waveform diagram illustrating the PFC switching operation when there is no delay in phase current signal according to the embodiment of the present invention. FIG. 4 is a waveform diagram illustrating the PFC switching operation when a phase current signal is delayed according to the embodiment of the present invention.

As can be seen from FIG. 3, if there is no delay in phase current signal, the common potential terminal's current waves detected by the first current detector 40 flow in the same direction as that of the phase voltage, and the PFC switching begins at the zero-crossing point.

Otherwise, as can be seen from FIG. 4, if the phase-current delay has occurred, the common potential terminal's current waves detected by the first current detector 40 flow in the direction opposite to that of the phase voltage, such that the PFC switching cannot begin at the zero-crossing point. In this case, a phase difference between the voltage and the current increases, such that the power factor is further deteriorated due to the PFC operation.

Figure 5:
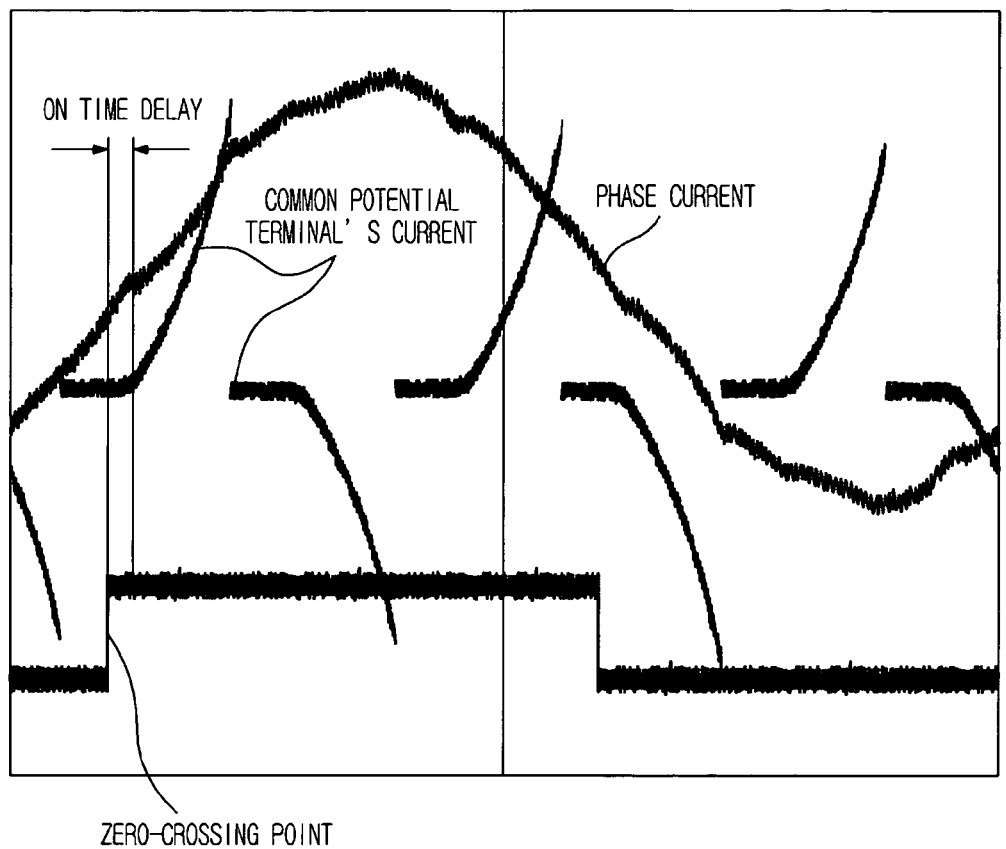
FIG. 5 is a waveform diagram illustrating a PFC switching operation controlling a power factor correction of the three-phase inverter according to the embodiment of the present invention.

Accordingly, if the phase-current delay has occurred at operation 104, the controller 50 delays the PFC switching operation (i.e., ON times of the switching elements 31-33 for the PFC operation) from the zero-crossing point of the phase voltage by the PFC switching delay time as shown in FIG. 5, and performs an optimum PFC switching to generate little phase difference between the phase voltage and the phase current, such that it improves the power factor at operation 106. In this case, ON-time delays (i.e., PFC switching delay times) of the switching elements 31-33 are prescribed in the controller 50. Each ON-time delay is indicative of an exemplary time consumed until the phase voltage signal has the same phase as that of the phase current signal.

The controller 50 determines whether a predetermined time elapses after the ON-times of the switching elements 31-33 are delayed at operation 108. The controller 50 automatically decreases the ON-time delays of the switching elements 31-33 at intervals of the predetermined time at operation 110. In this case, the ON-time delays (i.e., the PFC switching delay time) of the switching elements 31-33 are also prescribed in the controller 50. Each On-time delay is indicative of an exemplary time consumed until the phase voltage signal has the same phase as that of the phase current signal.

Also, in order to continuously decrease the ON-time delays of the switching elements 31-33 at intervals of the predetermined time, the controller 50 re-determines whether there arises the phase-current delay caused by the decreased ON-time delays of the switching elements 31-33 at operation 112, such that it continuously observes a performance of the PFC operation caused by the phase-current delay.

As is apparent from the above description, the PFC device in three-phase power supply (i.e., the three-phase PFC device) according to the embodiment of the present invention detects erroneous operations of the three-phase inverter using a current sensor located at a common potential terminal. In this case, the erroneous operations may occur in the PFC operation due to the delay of an input current signal of the three-phase inverter based on a switching control scheme implementing the power factor correction (PFC). So, if the input-current delay occurs, the above-mentioned three-phase PFC device delays an ON time of each switching element from a zero-crossing point of the input voltage by a predetermined time, and performs an optimum switching operation caused by the input-current delay, resulting in the implementation of an increased power factor. Also, the ON-time delays of the switching elements are automatically decreased at intervals of a predetermined time, such that the PFC device can continuously observe the PFC performance.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A three-phase power factor correction (PFC) apparatus to operate on a three-phase power source, comprising:
    a rectifier to rectify the three-phase power source;
    a switching element which performs a power factor correction (PFC) switching operation to correct a power factor of the rectifier;
    a zero-crossing detector to detect a zero-crossing point of an input voltage signal received from the three-phase power source;
    a current detector to detect a delay of an input current signal received from the three-phase power source; and
    a controller which delays the PFC switching from the zero-crossing point of the input voltage signal according to the delay of the input current signal, and controls the switching element;
    wherein the switching element comprises an output common potential terminal and the current detector is connected to the output common potential terminal of the switching element, such that the current detector detects an erroneous current loaded on the common potential terminal during the PFC.

2. The apparatus according to claim 1, wherein the rectifier comprises output terminals, and the switching element is an insulated gate bipolar transistor (IGBT) switch, which is connected to individual phases of the output terminals of the rectifier, and switches output signals of the individual phases to allow the output signals of the individual phases to have the same current and voltage phases.

3. The apparatus according to claim 1, wherein the erroneous current allows a current signal flowing in a direction opposite to a direction of the input voltage to have a peak value of at least a reference value.

4. The apparatus according to claim 3, wherein the controller determines a delay of the input current when the erroneous current occurs at least a predetermined number of times.

5. The apparatus according to claim 1, wherein the controller decreases the PFC switching delay time at intervals of a predetermined time, such that the controller continuously detects a performance of the PFC operation.

6. The apparatus according to claim 5, wherein the PFC switching delay time is a predetermined time consumed until the input voltage phase is equal to the input current phase.

7. A three-phase power factor correction (PFC) control method comprising:
    rectifying a three-phase power source;
    performing a power factor correction (PFC) switching on a switching element to correct a power factor of the rectified power source;
    detecting a zero-crossing point of an input voltage signal received from the three-phase power source;
    detecting a delay of an input current signal received from the three-phase power source; and
    delaying the PFC switching from the zero-crossing point of the input voltage signal according to the delay of the input current signal, and controlling the switching element according to the delayed result;
    wherein the switching element comprises an output common potential terminal and the delay of the input current signal is detected at the output common potential terminal of the switching element, such that an erroneous current loaded on the common potential terminal is detected during the PFC.

8. The method according to claim 7, wherein the detecting the delay of input current signal includes:
    detecting an erroneous current loaded on a common potential terminal of the switching element during the performing the PFC switching, determining whether the erroneous current signal occurs at least a predetermined number of times during a predetermined time, and determining the delay of the input current signal if the erroneous current signal has occurred at least the predetermined number of times during the predetermined time.

9. The method according to claim 8, wherein the erroneous current allows a current signal flowing in a direction opposite to a direction of the input voltage to have a peak value of at least a reference value.

10. The method according to claim 8, wherein the delaying the PFC switching includes:
    if the input current delay has occurred, delaying an ON time of the switching element from the zero-crossing point of the input voltage by a predetermined PFC switching delay time, and controlling the switching operation according to the delayed result.

11. The method according to claim 10, wherein the PFC switching delay time is a predetermined time consumed until the input voltage phase is equal to the input current phase.

12. The method according to claim 10, wherein the PFC switching delay time is decreased at intervals of a predetermined time, such that a performance of the PFC operation is continuously detected.

* * * * *